(12) United States Patent
Braun et al.

(10) Patent No.: US 7,082,444 B2
(45) Date of Patent: Jul. 25, 2006

(54) METHOD AND SYSTEM FOR IDENTIFYING A FORM VERSION

(75) Inventors: John F. Braun, Weston, CT (US); John W. Rojas, Norwalk, CT (US); James R. Norris, Danbury, CT (US); Jean-Hiram Coffy, Norwalk, CT (US); Arthur Parkos, Southbury, CT (US); Alan Leung, New York, NY (US); Wendy Chui Fen Leung, Woodside, NY (US)

(73) Assignee: Pitney Bowes Inc., Stamford, CT (US)

( * ) Notice: Subject to any disclaimer, the term of this patent is extended or adjusted under 35 U.S.C. 154(b) by 326 days.

(21) Appl. No.: 10/065,283

(22) Filed: Sep. 30, 2002

(65) Prior Publication Data

US 2004/0064486 A1 Apr. 1, 2004

(51) Int. Cl.
*G06F 17/30* (2006.01)

(52) U.S. Cl. .................................................... 707/203
(58) Field of Classification Search ................ 707/203, 707/104.1; 713/176
See application file for complete search history.

(56) References Cited

U.S. PATENT DOCUMENTS

| | | | |
|---|---|---|---|
| 1,684,756 A | 9/1928 | Close ........................... 462/67 |
| 3,273,123 A | 9/1966 | Lowitz ........................ 382/202 |
| 5,243,149 A | 9/1993 | Comerford et al. ....... 178/18.03 |
| 5,453,762 A | 9/1995 | Ito et al. ..................... 345/179 |
| 5,561,446 A | 10/1996 | Montlick | |
| 5,587,560 A | 12/1996 | Crooks et al. ........... 178/18.03 |
| 5,612,720 A | 3/1997 | Ito et al. ..................... 345/179 |
| 5,684,990 A * | 11/1997 | Boothby ..................... 707/203 |
| 5,897,648 A | 4/1999 | Henderson | |
| 6,050,490 A | 4/2000 | Leichner et al. | |
| 6,081,261 A * | 6/2000 | Wolff et al. ................. 345/179 |
| 6,201,903 B1 | 3/2001 | Wolff et al. | |
| 6,208,771 B1 | 3/2001 | Jared et al. ................. 382/306 |
| 6,259,043 B1 | 7/2001 | Clary et al. ............. 178/18.01 |
| 6,310,988 B1 | 10/2001 | Flores et al. ................ 382/313 |
| 6,311,042 B1 | 10/2001 | DeSchrijver ................. 455/66 |
| 6,327,395 B1 | 12/2001 | Hecht et al. ................ 382/306 |
| 6,330,976 B1 | 12/2001 | Dymetman et al. | |
| 6,396,598 B1 | 5/2002 | Kashiwagi et al. ......... 358/474 |
| 6,422,474 B1 | 7/2002 | Gossweiler, III et al. | |

(Continued)

FOREIGN PATENT DOCUMENTS

JP 2001-43000 A 2/2001

OTHER PUBLICATIONS

Anoto Advertising Booklet—"Uniting Handwriting with the Digital World", undated, 15 pages.

(Continued)

*Primary Examiner*—Paul L. Rodriguez
*Assistant Examiner*—Luke Osborne
(74) *Attorney, Agent, or Firm*—George M. Macdonald; Steven J. Shapiro; Angelo N. Chaclas

(57) ABSTRACT

The present application describes systems and methods for identifying the version of a form using a digital pointing device. In one example, a form includes an RFID tap or barcode including a form version number. When a user is prepared to fill in the form, the digital pen checks a form database to determine if the form version is acceptable. If the form version is not acceptable, the digital pen indicates to the user that the form is not acceptable using an indicator.

13 Claims, 2 Drawing Sheets

U.S. PATENT DOCUMENTS

| | | | |
|---|---|---|---|
| 6,456,740 B1 | 9/2002 | Carini et al. | 382/187 |
| 6,502,756 B1 | 1/2003 | Fahraeus | 235/494 |
| 6,548,768 B1 | 4/2003 | Pettersson et al. | 178/18.01 |
| 6,570,104 B1 | 5/2003 | Ericson et al. | 178/18.09 |
| 6,573,887 B1 | 6/2003 | O'Donnell, Jr. | 345/179 |
| 6,577,300 B1 | 6/2003 | Picoult et al. | 345/179 |
| 6,586,688 B1 | 7/2003 | Wiebe | 178/18.09 |
| 6,594,406 B1 | 7/2003 | Hecht | 382/306 |
| 6,609,653 B1 | 8/2003 | Lapstun et al. | 235/375 |
| 6,627,870 B1 | 9/2003 | Lapstun et al. | 250/221 |
| 6,666,376 B1 * | 12/2003 | Ericson | 235/454 |
| 6,681,045 B1 | 1/2004 | Lapstun et al. | 382/187 |
| 6,698,660 B1 * | 3/2004 | F.ang.hraeus et al. | 235/472.01 |
| 2001/0055411 A1 | 12/2001 | Black | 382/124 |
| 2002/0006212 A1 * | 1/2002 | Rhoads et al. | 382/100 |
| 2002/0035687 A1 | 3/2002 | Skantze | 713/168 |
| 2002/0057824 A1 | 5/2002 | Andreasson | 382/101 |
| 2002/0065042 A1 | 5/2002 | Picoult et al. | |
| 2002/0065101 A1 | 5/2002 | Picoult et al. | |
| 2002/0067854 A1 | 6/2002 | Reintjes et al. | 382/199 |
| 2002/0080386 A1 | 6/2002 | Snowdon et al. | |
| 2002/0107885 A1 | 8/2002 | Brooks et al. | 707/505 |
| 2002/0126105 A1 | 9/2002 | O'Donnell, Jr. | 345/179 |
| 2002/0146170 A1 | 10/2002 | Rom | 382/175 |
| 2002/0169963 A1 * | 11/2002 | Seder et al. | 713/176 |
| 2002/0193975 A1 | 12/2002 | Zimmerman | 703/6 |
| 2003/0001020 A1 | 1/2003 | Kardach | 235/494 |
| 2003/0046256 A1 | 3/2003 | Hugosson et al. | 707/1 |
| 2003/0133629 A1 | 7/2003 | Sayers | 382/313 |

OTHER PUBLICATIONS

Anoto Advertising Booklet—"Hey, Guess What Those Nifty Swedes Have Dreamed Up Now to Revolutionize Digital Communiction?!", undated, 22 pages.

"A Comparison of Anoto Technology with Other Releeant Systems." Undated. 17 pages.

Anoto Functionality—World Wide Web pages from www.anotofunctionality.com. Accessed Jan. 29, 2004. 7 pages.

Unknown Anoto, Subsidiary of C Technologies, Initiates Collaboration with John Dickinson, UK's Leading Producer of Stationary Products, Apr. 23, 2001, Business Wire, 2 pages.

* cited by examiner

FIG. 2A  FIG. 2B

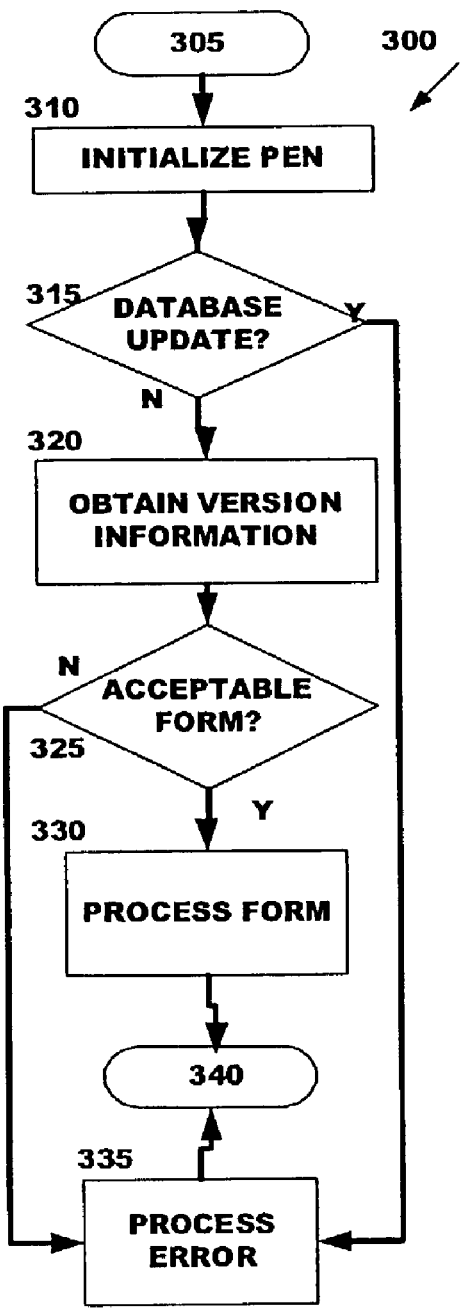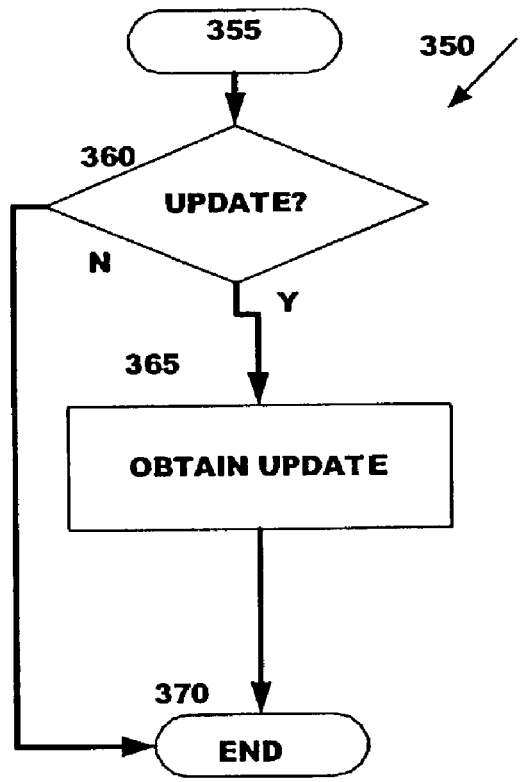
FIG. 3A
FIG. 3B

METHOD AND SYSTEM FOR IDENTIFYING A FORM VERSION

BACKGROUND OF THE INVENTION

The illustrative embodiments disclosed in the present application are useful in systems including those for processing forms and more particularly are useful in systems including those for identifying a form version in a form processing system having a digital pointing device such as a digital pen.

Traditional paper based forms are used in many situations. Typically, a form will include pre-printed information and pre-printed boxes for data input. Such a traditional form might be filled in be a salesman in the field. In such a situation, a salesman would fill in some information on the form and send the form to a central processing location by mail or facsimile. The data on the form would typically be scanned or keyed in by an operator.

In using a traditional pre-printed form, the user fills in data input spaces using an ink pen. The user typically has no way of knowing whether the form being used is the latest version of the form or at least an acceptable version of the form. Accordingly, the user may submit an outdated form that cannot be processed.

A reference entitled Forms Automation System is shown in U.S. Pat. No. 5,563,999 issued Oct. 8, 1996 to Yaksich, et al. and is incorporated herein by reference.

SUMMARY OF THE INVENTION

The present application describes illustrative embodiments of systems and methods for processing forms using a digital pointing device. In further illustrative embodiments, a user utilizes a digital pen to ensure that an appropriate version of a form is being utilized. In a further illustrative embodiment, the digital pen is disabled if the version of the form being used is not a valid version.

BRIEF DESCRIPTION OF THE DRAWINGS

FIG. 2A is a schematic representation of a first version of a pre-printed form according to an illustrative embodiment of the present application.

FIG. 2B is a schematic representation of a second version of a pre-printed form according to an illustrative embodiment of the present application.

FIG. 3A is a flow chart showing a process for identifying a form version according to the illustrative embodiment of the present application.

FIG. 3B is a flow chart showing a process for updating a form version database according to the illustrative embodiment of the present application.

DETAILED DESCRIPTION

Figure 1:
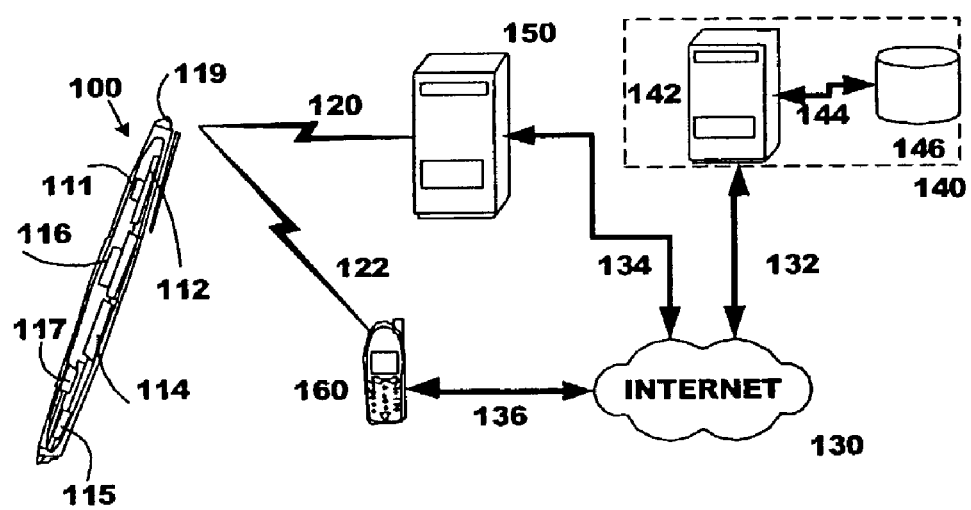
FIG. 1 is a schematic representation of a digital pen system according to an illustrative embodiment of the present application.

A method and system for generating documents is shown. In an illustrative embodiment, a system and method for using a digital pen to input data using a pre-printed form is described that is used to ensure that a valid version of the form is being used.

Digital pointing devices such as the pen and tablet systems available from Wacom Technology Corp. of Vancouver, Wash. allow a user to utilize a computer to capture pen strokes that the user traces over a tablet. Digital pointing devices may utilize capacitive sensors or other grid based sensors to determine absolute or relative position of the pointing device.

Digital pens allow a user to capture or digitize handwriting or pen strokes that the user writes on a medium such as a piece of paper by using a processor such as a personal computer. Certain digital pens utilize an imaging device to scan or record an image of the pen stroke. Certain other digital pens use mechanical sensors in order to record a pen stroke. The pen systems may utilize positioning systems such as light-based scanning systems including infrared (ir) sources and detectors in order to determine an absolute or relative position of the pen. Digital pen systems include the N-Scribe system available from Digital Ink of Wellesley, Mass. and the E-Pen system available from E-Pen InMotion of Matam, Haifa Israel. A digital pointing device includes the V-Pen system available from OTM Technologies of Herzliya Israel.

Another digital pen system is the Sony-Ericsson CHA-30 Chatpen and Anoto paper available from Anoto AB of Sweden. The Chatpen utilizes a Bluetooth transceiver in order to communicate with a processor and the Anoto paper includes a grid encoding information such position information that is detected by the Chatpen. Additional information may be captured including information related to pressure, speed and pen attitude. The additional information includes biometric information that may be used to identify or authenticate a user.

A reference describing a handheld writing device is shown in U.S. Pat. No. 6,050,490, issued Apr. 18, 2000 and is incorporated herein by reference. A reference entitled method and apparatus for wireless remote information retrieval and pen-based data entry is shown in U.S. Pat. No. 5,561,446 issued Oct. 1, 1996 to Montlick and is incorporated herein by reference.

Co-pending U.S. patent application Ser. No. 10/065,281, entitled Method And System For Creating And Sending a Facsimile Using a Digital Pen, filed on Sep. 30, 2002, is incorporated by reference in its entirety.

Co-pending U.S. patent application Ser. No. 10/065,282, entitled Method And System For Creating a Document Having Metadata, filed on Sep. 30, 2002, is incorporated by reference in its entirety.

Co-pending U.S. patent application Ser. No. 10/065,284, entitled Method And System For Remote Form Completion, filed on Sep. 30, 2002, is incorporated by reference in its entirety.

Co-pending U.S. patent application Ser. No. 10/065,285, entitled Method And System For Identifying a Paper Form Using a Digital Pen, filed on Sep. 30, 2002, is incorporated by reference in its entirety.

The Digital Pen.

The present application describes systems and methods for composing documents using a pointing device. The illustrative embodiments described herein utilize a digital pen in order to compose a document and indicate delivery information for a completed document. However, other sensing devices may be utilized to compose other documents.

The digital pen is utilized to capture information regarding the pen strokes made by a user. In the illustrative embodiments described herein, a digital pen having a sensor for reading version data, a non-volatile storage for version data, a counter or clock and a communications channel is used. In another embodiment, audio or visual indicators are utilized and an ink inhibition system is utilized. The processor includes a micro-controller such as an 8051 based micro-controller with code to perform the form version check and communications routines.

Toolkits for the development of the processes and stroke data interpretation are known as is processing biometric data including stroke data.

However, other digital pens may also be utilize. Certain digital pens utilize position determination for determining the actual location of the pen on a piece of paper in order to provide a relative location in terms of the location in the space of the piece of paper. Certain digital pens scan the ink as it is applied to digitize a stroke while others sense the stroke using sensors such as pressure sensors, Doppler sensors, accelerometers and other sensing mechanisms.

The illustrative embodiments describe methods and apparatus for capturing pen strokes and for capturing form identification information. The form identification data may include a form serial number, form number and version number. The form identification information may be captured using digital pen stroke data. Additional methods and apparatus for sensing the form version are described. The processes and apparatus described may be implemented using hardware, software or a combination of both. The communications channels may be wireless or wired and may utilize security techniques such as encryption. The data storage and data processors may be locally or remotely located.

The Document Composition System.

Referring to FIG. 1, a first illustrative embodiment describing a digital pen form verification system is shown.

Digital Pen 100 includes a processor 114, memory 112, ink 117, a camera or image sensor 115, a battery 116 and a wireless transceiver 111. The pen 100 includes an LED 119. It also includes pen stroke data and biometric sensors (not shown). In an alternative, the ink 117 is machine detectable. In another embodiment, the ink is invisible. In an alternative, the pen includes other visual indicators such as an LCD display. In an alternative, the pen includes audio indicators such as a speaker, buzzer or speech synthesizer. In another embodiment other feedback devices such as tactile feedback are provided.

The pen 100 includes a pen tip (not shown) that writes using the ink 117. Writing sensors (not shown) provide data regarding the stroke such as pressure, speed and pen attitude. The pen includes an ink-inhibiting device so that the processor 114 can stop the flow of ink 117. The memory 114 includes a non-volatile memory. The pen 100 includes a real time clock (not shown). Alternatively, a counter may be utilized. The pen 100 utilizes a wireless transceiver 111 that is a Bluetooth™ transceiver. Alternatively, other wireless communication channels can be utilized. In another alternative, a wired communications channel such as a docking station may be utilized in addition to or as a replacement for the wireless transceiver.

In another alternative, the pen includes audio input/output including synthesized voice output and voice recognition. Visual output is provided using an LCD display and LEDs and tactile feedback is provided using servomechanisms. Physical input includes an input button.

Bluetooth™ utilizes several layers of security. At a link level, remote/local device authentication is required before any communication can take place. At the Channel level, a link level connection occurs and then the devices need to authenticate before a communications channel is established. Additionally, the data payload being transmitted may be encrypted. In this embodiment, appropriate security at several protocol layers is utilized including the application layer.

The embodiments described herein may utilize biometric data for purposes including identification and authentication of a user. In another embodiment, the digital pen is a Chatpen digital pen available from Anoto, AB. The pen provides biometric data relating to the pen strokes used including hand speed, pen tip pressure and the inclination angle between pen and paper. Such data is referred to herein as BIODATA. In alternative embodiments, the BIODATA may include other biometric data such as a retinal scan or fingerprint scan performed using an external processor such as processor 150. The pen is assigned a unique identification code that is a unique serial number for the pen. In an alternative, the PUID is a Bluetooth™ MAC code or other unique or group assigned code.

The system includes at least one pen 100 that establishes a personal area network using Bluetooth™. The paired device may be a Bluetooth™ router or other processor 150 that connects to the digital pen 100 using wireless connection 120 and provides a gateway using communications connection 134 to the Internet 130. The paired device may include a cellular telephone or PDA 160 that has a Bluetooth connection 122 and a connection 136 to the Internet 130.

Here, the system includes a server 140 that includes storage 146 connected by connection 144 to processor 142. The server 140 is connected to the Internet 130 using communications channel 132. The server hosts a form version database that is periodically downloaded to the pen 100. Alternatively, processor 150 or cellular device 160 includes the form version database (not shown) that can be uploaded to the pen 100. Server 140 or processor 150 may be utilized for other digital pen back end activities including pen stroke data analysis and background pattern lookup services.

It is contemplated that all of the connections utilize appropriate security measures. Other well-known input devices, servers, processors, networks and communications mechanisms may be used. A back-end application may be utilized to process pen strokes. The back end application then recognizes command strokes or strokes in command locations identified by the pattern. The data written by a user in a particular data input flied can be rasterized and then subjected to Optical character recognition (OCR) in order to identify the data written by the user.

Processor 150 utilizes a mobile Pentium 4 processor and Windows XP. The server processors are geographically and load balanced application servers using systems available from Sun Microsystems and the storage servers use multiple location redundant backup systems. Additionally, other appropriate wireless and wired networks and connections may be utilized. It is contemplated that other communications channels such as OC-3 lines or wireless connections could be used in place of the T1 lines. Similarly, the other communications channels could be replaced with alternatives. As can be appreciated, various communication flows may be utilized, some of which will be chattier than others.

The present embodiment may alternatively use any pen or stylus like device that provides for electronically recording strokes. Position information may be processed into strokes or transmitted in a separate data stream.

The digital pen 100 approximates the size of a traditional pen and may be used by a user to handwrite information.

Referring to FIGS. 2A and 2B, a schematic representation of a first source form and second source form are shown respectively. Form 200 is a first version of a form indicated by form version indicator 208. The form version indicator can include human-readable or machine-readable data and may alternatively include an RF-ID tag or other data-storing device. The sales form 200 includes a pattern background 202. The form 200 includes data item 204 for a name entry and item 206 for sales items entries.

Form 210 is a second version of the same form type having background 212. The form 210 includes data item 214 for a name entry and item 216 for sales items entries. Form 210 includes a version indicator 218.

Referring to FIG. 3A, flowchart describes the process of validating the correct version of a form.

The process 300 starts in step 305 and proceeds to initialization in step 310 in which the user is prepared to use the digital pen to fill in a form. The digital pointing device checks to determine if a form database update is required in step 315 and if not, obtains version information from the form in step 320. If an update is required, an error routine is processed. The digital pen uses the internal clock to update the database at least once a week. Other update schedules may be used and the pen may be updated asynchronously. The digital pen will be disabled if the form version database is out of date until the database is updated. Alternatively, the pen will work and signal the user that the form is out of date. Alternatively, the pen will signal the source of the forms that outdated forms are present. In such a situation, the form source may send updated forms to the location.

The digital pen processor then compares the obtained form version input information. In this embodiment, the form includes an RF-ID tag having form information and the digital pen scans that information. Alternatively, a bar code is used on the form and the pen is used to scan the bar code. Alternatively, a traceable identifier is used. Additionally, a lookup patterns such as the Anoto pattern may be used to identify the form version.

The digital pen processor compares the obtained form version information to the form version database in step 325 to determine if the form version is acceptable. In this embodiment, the form must be the latest version to be acceptable. In an alternative more than one version of the form may be acceptable. The process 300 then proceeds to step 330 if the form is acceptable and processes the form. If the form is not acceptable, the pen processes the unacceptable version routine in step 335 and ends in step 340.

In step 335, the unacceptable version routine includes indicating to the user that the form is not acceptable using audio and/or visual indicators that include a buzzer, speaker or speech synthesizer and a flashing LED, LCD display. The routine also inhibits ink flow and otherwise disables the ability to fill in a form until an acceptable form version is scanned.

In an alternative, the digital pen will still function after finding an unacceptable form. In another alternative, the form source is notified of the unacceptable version.

In an alternative, a positive indication is provided for an acceptable version of the form that may include a flashing green LED as opposed to a Red LED or another audio or visual indication. Additionally, the ink flow will not be inhibited.

An indication of form completion can be used to reset the digital pen so that it can repeat the process for the next form. The indication may be a special barcode that is scanned or other input data that may also include elapsed time.

In an alternative, the pen dispenses identifiable ink and the only ink that is accepted on the version controlled form.

Referring to FIG. 3B, a process 350 for updating the form version database is shown. The process 350 starts in 355 and proceeds to a version update check in step 360. The form version database is updated periodically or otherwise such as the first use of the day. If the version needs to be updated, the database is obtained from the remote database server and is stored in the non-volatile memory in step 365 and the process ends in step 370.

In another alternative, digital paper is utilized. The digital paper will only allow certain devices to write upon the digital paper and an attempt to write on the digital paper using a non-approved digital stylus will not succeed.

Known systems such as C++ or Word and VBA may be utilized. The Anoto toolkit may be utilized. The authentication data may be used to ensure that only authorized users have access to the forms and data. In an alternative applicable to any of the embodiments described, the form processor can use the pen stroke data and pen identification data to determine if the salesman or user has authority to use the particular form, to deal with the particular client, or to sell the particular items requested. If the user is not authorized, the ink supply 117 could be disabled or the pen otherwise disabled.

In another embodiment, the form version indicator is a traceable indicator such as an alphanumeric sequence of characters that the user traces to input form version data. In any of the described embodiments, error indications or messages may be communicated using LED indicators, a display such as an LCD display or audio indications such as beeps or synthesized speech using a speaker. Additionally, tactile feedback may be utilized to indicate an error condition or provide other feedback such as an indication that a form was successfully sent.

In another alternative applicable to any of the embodiments, Wi-Fi enabled wireless systems are utilized and the external processor comprises a Wi-Fi capable hand-held pocket PC such as the Toshiba e740 Pocket PC. Furthermore, differing types of processors and logic systems may be supported. For example, JAVA based PALM OS devices may be utilized. The message logic, processing logic, security logic, user interface logic, communications logic and other logic could be provided in JAVA format or in a format compatible with individual platforms such as Windows CE and PALM OS. Similarly, other portable computing devices such as laptop computers and tablet computers and wireless capable computers could be utilized. Other platforms such as those using Symbian OS or OS-9 based portable processors could be utilized.

In another alternative applicable to any of the embodiments, authentication procedures utilize a token controller having a secure token key storage such as an iButton® available from Dallas Semiconductor in which an attack, for example, a physical attack on the device, results in an erasure of the key information. Passwords may be used, such as a password to access the device. In an alternative, the password may include biometric data read from a user. Alternatively, other secret key or public key systems may be utilized. Many key exchange mechanisms could be utilized included a Key Encryption Key. Additionally, authentication and repudiation systems such as a secure hash including SHA-1 could be utilized and encryption utilizing a private key for decryption by public key for authentication.

The present application describes illustrative embodiments of a system and method for composing documents using a pointing device and in one embodiment describes a digital pen system for composing and sending a completed form to a destination indicated by the user using the digital pen. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A method for identifying an acceptable version of a form comprising:
   initializing a pointing instrument having a form version database,
   wherein the form version database includes form identification data including a form type identifier and a version number;
   determining if the form version database must be updated;
   providing an indication to a user if the form version database must be updated;
   obtaining form version data from the form;
   determining whether the form is an acceptable version using the form version database and the form version data by using the form type identifier and providing an indication to the user if the form is not an acceptable version;
   processing pointing instrument input data obtained by using the pointing instrument with the form only if the form is an acceptable version.

2. The method of claim 1 wherein the form version data is obtained by reading an RF-ID tag.

3. The method of claim 1 wherein the form version data is obtained by scanning a bar code.

4. The method of claim 1 wherein the form version data is obtained by obtaining user stroke data.

5. The method of claim 4 wherein the user stroke data is obtained when the user traces over a form indicator.

6. The method of claim 5 wherein the form indicator is a serial number pre-printed on the form in a dashed font.

7. The method of claim 1 further comprising:
   updating the form version database periodically.

8. The method of claim 1 further comprising:
   disabling the digital pen if the form version database must be updated.

9. The method of claim 1 further comprising:
   signaling a source of forms to indicate the presence of outdated forms if the form is not an acceptable version.

10. The method of claim 1 wherein the form version data is obtained by obtaining lookup pattern data.

11. A method for authorizing the use of a version of a form comprising:
    initializing a pointing instrument having a form version database, wherein the form version database includes form identification data including a form type identifier and a version number;
    determining if the form version database must be updated;
    authenticating a user of the pointing instrument;
    obtaining form version data from the form;
    determining whether the form is an acceptable version using the form version database and the form version data by using the form type identifier and the version number;
    providing an indication to a user if the form version database must be updated;
    determining whether the user is an authorized user of the form version using the form version database;
    providing an indication to the user if the form is not an acceptable version;
    processing pointing instrument input data obtained by using the pointing instrument with the form only if the form is an acceptable version and the user is authenticated
    wherein the pointing instrument is a digital pen and the form is printed on paper.

12. The method of claim 11 further comprising:
    disabling the digital pen if the user is not an authorized user of the form version.

13. The method of claim 1 wherein the form version database includes a range of acceptable form type identifiers and determining whether the form is an acceptable version includes determining if the form version data indicates a form type in the acceptable range.

* * * * *